April 17, 1956
W. S. GLEESON
2,742,030
AUTOMATIC CLEARANCE ADAPTER
Filed June 26, 1953
2 Sheets-Sheet 2
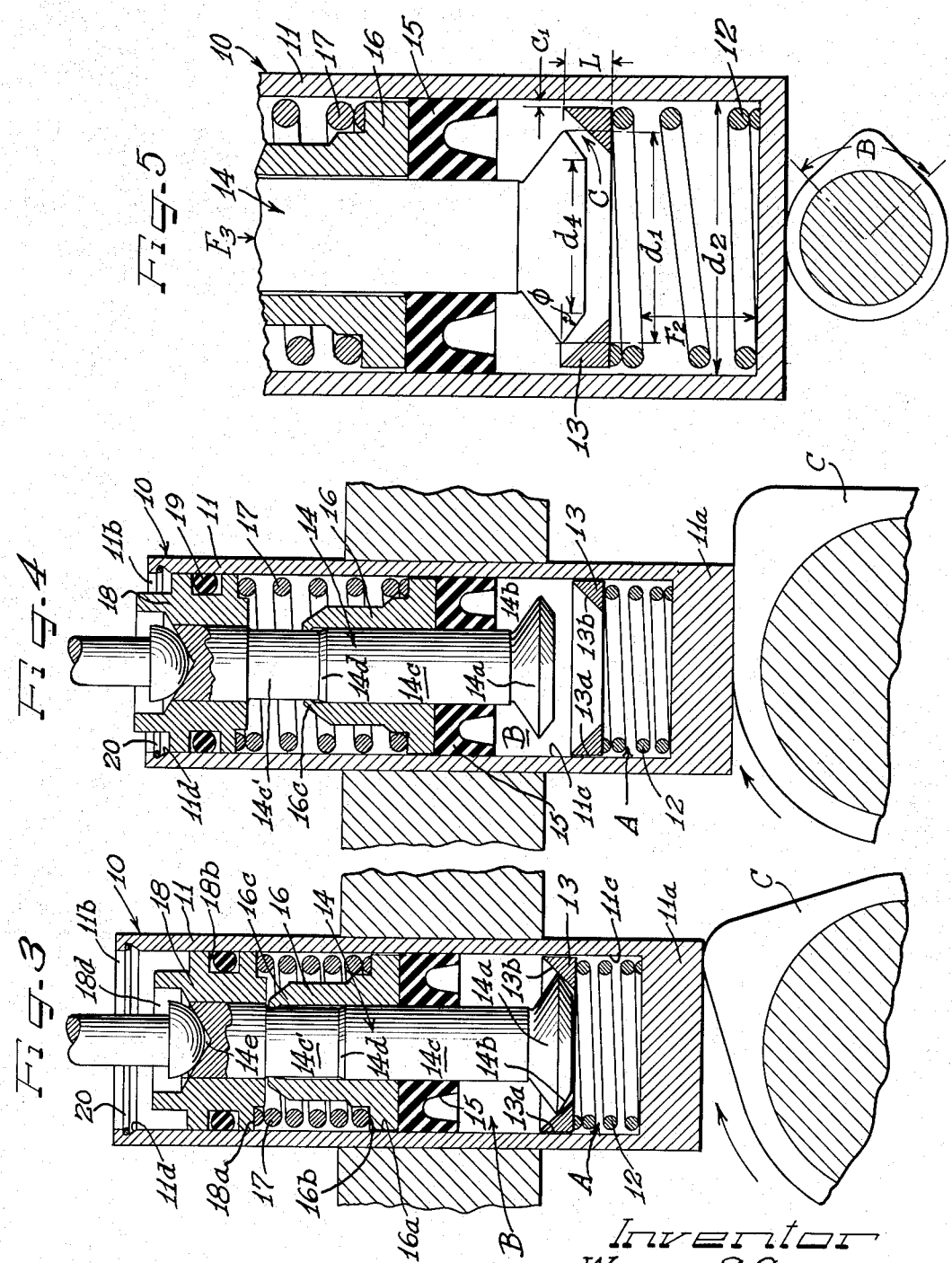
Inventor
WILLIAM S. GLEESON
by
Attys.

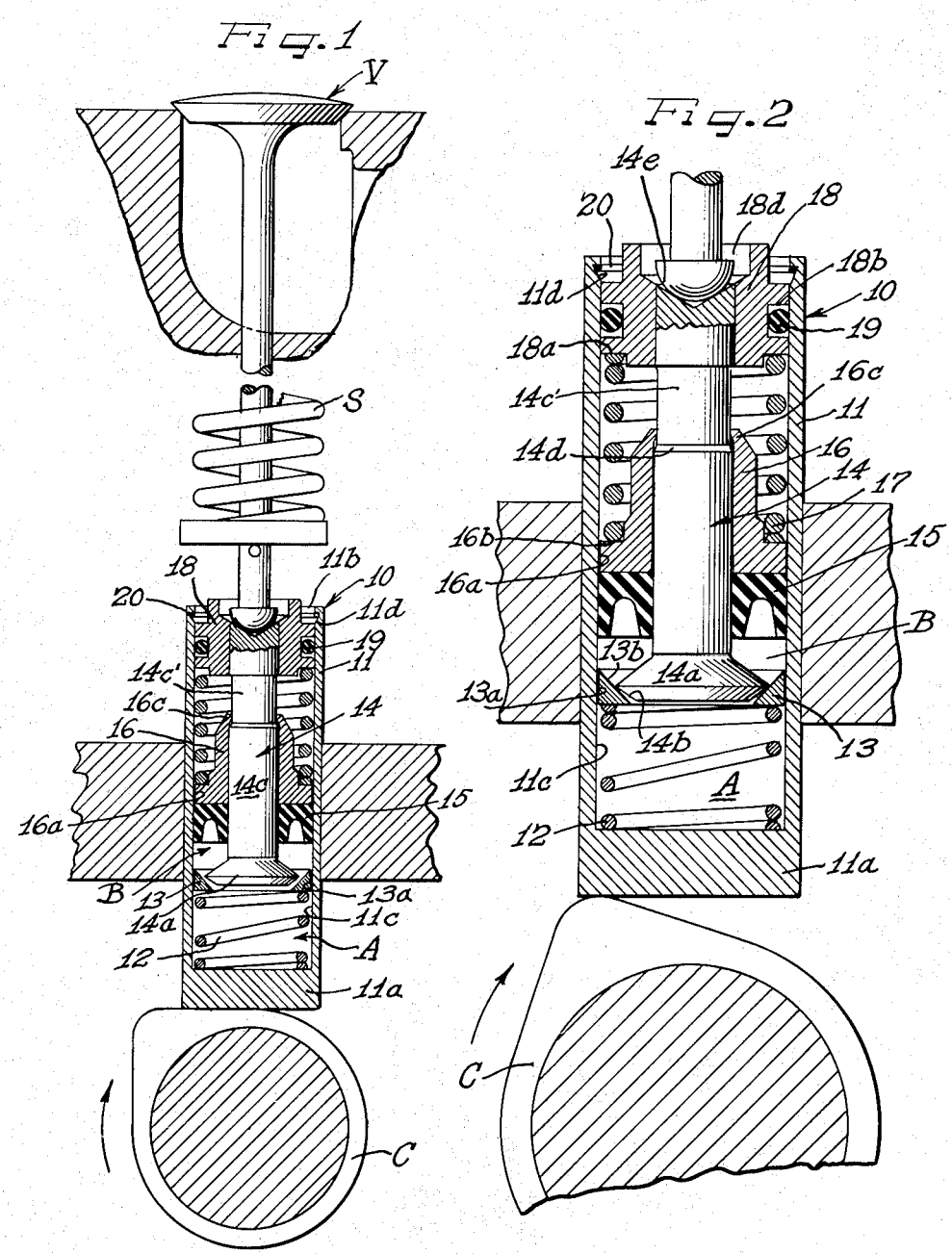

United States Patent Office 2,742,030
Patented Apr. 17, 1956

2,742,030

AUTOMATIC CLEARANCE ADAPTER

William S. Gleeson, Euclid, Ohio, assignor to Thompson Products, Inc., Cleveland, Ohio, a corporation of Ohio Application June 26, 1953, Serial No. 364,348

5 Claims. (Cl. 123—90)

This invention relates to automatic clearance regulators or lash adjusters having predetermined clearance capacity without the addition of separate control mechanisms for performing a constant clearance function.

More particularly, this invention relates to a hydraulic automatic tappet including a thrust transmitting control valve and having the valve and other parts of the tappet related to each other according to a predetermined formula whereby they will function to provide a constant clearance control within a predetermined dimension range.

Automatic clearance regulators such as valve tappets are designed to take up looseness or play by maintaining a load on extensible parts under all conditions of operation. These regulators or tappets will respond to any irregularities in the operating mechanism because they are incapable of distinguishing looseness or play due to mechanical irregularities from looseness or play due to thermo-expansion and contraction. Such automatic regulators thereby frequently cause an over-control to produce an undesired tightness in the linkage which, in the case of valve tappets, will prevent full seating of the poppet valve.

Heretofore, safety devices such as spring washers or the like, have been added to clearance regulators to preserve a predetermined constant clearance in a linkage including the regulator. These devices will collapse when the linkage is loaded as during a poppet valve opening cycle, but will expand when the linkage is unloaded thereby preventing over-control by the regulator.

The present invention now prevents over-control of automatic clearance regulators without adding additional parts to the regulator. In accordance with this invention, heretofore required tappet parts are eliminated without loss of function by regulating and controlling the relationship of the tappet parts which perform other functions.

The principles of this invention are embodied in a hydraulic valve tappet of the thrust transmitting type.

The thrust load transmitting valve type hydraulic tappets of this invention are subject to laminar flow of the hydraulic fluid during operation and being intended for use in modern relatively high-speed engines, are subject to rapid cycling so that the change in clearance for any single cycle is necessarily relatively small. In these operating conditions, the maximum clearance is produced at the time of valve opening.

Since all hydraulic tappets involve a certain amount of leakdown during the load-applying or valve-opening cycle, this leakdown must be balanced with a reverse flow of hydraulic fluid during the valve-closing cycle. At equilibrium conditions, the leakdown and the leakup are necessarily equal. Under transient operating conditions wherein the tappet must adjust to a new length, the leakdown and leakup are unequal. Since, at moderate to high engine speeds, variation in clearance while the valve is closed will be relatively small, this clearance can be considered constant and in accordance with this invention, the tappets are capable of maintaining a desired constant clearance.

In a thrust load transmitting valve of a hydraulic tappet, the flow of fluid is necessarily throttled as the valve approaches its seat and theoretically an infinitely long time is required for full seating when the tappet is unloaded. In actual operation in an engine valve train some opening will always exist during the load-free or closed engine valve cycle. When the tappet is then loaded by the engine valve spring during the open engine valve cycle, the tappet valve is then seated to shorten the tappet. Since no added parts are involved, the invention deals with a mathematical relationship of tappet parts which have other functions than constant clearance producing functions. This mathematical relationship includes the following factors which are built into the tappet to produce a constant clearance dimension within a predetermined range:

1. Leakdown clearance,
2. Length of leakdown passage,
3. Angle of the valve seat,
4. Load on the valve seat spring,
5. Bore diameter of the tappet, and
6. Tappet valve diameter.

The preferred constant clearance dimension range for commercial cam operated engine poppet valves is .001" to .003" although a much wider range of from .0005" to .030" is operative.

It is then an object of this invention to provide a clearance regulator adapted to maintain predetermined constant clearance dimensions in a linkage and being free from added parts which only have constant clearance maintenance capacity.

Another object of this invention is to provide a thrust load transmitting type of hydraulic clearance regulator with the valve and other parts thereof so related as to maintain a constant clearance of desired magnitude.

A further object of this invention is to provide a simplified thrust load carrying valve type of hydraulic tappet having its operating parts so related as to maintain a constant clearance in a cam actuated poppet valve linkage of from .0005" to .030".

A still further object of this invention is to build into the operating parts of a thrust transmitting valve type of hydraulic tappet a relationship of clearance to cause the tappet to have a constant clearance capacity of controlled magnitude in a cam actuated valve linkage.

A specific object of this invention is to provide a thrust valve hydraulic tappet with a valve and seat arrangement that remains open during the unloaded operating cycle of the tappet and closes at the start of the loaded operation cycle to provide a constant operating clearance in the engine valve linkage of from .0005" to .030".

Other and further objects of this invention will be apparent to those skilled in the art from the following detailed description of the annexed sheets of drawings which, by way of a preferred example only, illustrate one embodiment of the invention.

On the drawings:

Figure 1 is a longitudinal cross-sectional view, with parts in elevation, of an engine valve linkage including a hydraulic valve lifter or tappet according to this invention and showing the positions of the parts just prior to the valve opening operation.

Figure 2 is a view similar to Figure 1 but showing the positions of the tappet parts just after the engine valve has opened at the start of the open valve cycle.

Figure 3 is a view similar to Figures 1 and 2 but illustrating the positions of the tappet parts following the engine valve opening operation and just before the valve is closed.

Figure 4 is a view similar to Figures 1 to 3 illustrating the positions of the tappet parts just after the engine valve is closed.

Figure 5 is a fragmentary longitudinal cross-sectional view of the tappet on a larger scale than Figures 1 to 4 and designating the characteristics and relationship of the tappet parts which are controlled and related according to this invention to produce the built-in desired constant clearance.

As shown on the drawings:

The preferred tappet construction 10 shown in the drawings is exemplary of the type of thrust load transmitting valve hydraulic tappet which has the parts thereof related to provide the desired built-in constant clearance in an engine valve linkage within the broad rang of from .0005″ to .030″ and within the preferred range of from .001″ to .003.″ As shown best in Figures 1 to 4, the tappet 10 includes a cylindrical barrel or body 11 having a closed bottom 11a, an open top 11b, a smooth cylindrical bore 11c from the open top to the closed bottom, and an annular recess 11d near the open top 11b providing an abutment shoulder. A cam C acts on the closed bottom 11a of the tappet barrel 11 to raise and lower the tappet as is illustrated in the various positions of Figures 1 to 4.

A cylindrical coiled spring 12 rests on the bottom 11a of the barrel 11 inside the bore 11c and exerts a light spring force on a choke ring 13 which is freely slidable in the bore 11c. This choke ring 13 has an outer periphery 13a smaller than the bore 11c so as to provide a leakdown clearance relationship therebetween as will be hereinafter described. The choke ring has a converging hole therethrough providing a tapered seating face 13b with the divergent end of the hole facing the top of the tappet.

The thrust load transmitting valve of the tappet is illustrated at 14. This valve 14 has an enlarged head 14a with a tapered seating face 14b around the bottom thereof. As shown, this face coacts with the tapered seat 13b of the choke ring to control flow through the hole in the ring. A cylindrical shank 14c on the valve member has a sliding fit through a rubber cup member 15 which sealingly engages both the bore 11c and the shank 14c to confine fluid in the bottom portion of the tappet barrel.

A lower plunger member 16 composed of metal also slidably receives the shank 14c of the valve therethrough. The plunger has a free sliding fit with the bore 11c at its major diameter 16a. A shoulder 16b is provided adjacent this major diameter to bottom a cylindrical coiled return spring 17. The upper end of the plunger 16 is spun inwardly to a smaller diameter at 16c to slidably receive in snug relation a reduced diameter portion 14c′ of the valve shank 14c. This reduced diameter portion 14c′ is joined with the larger diameter portion of the shank through a tapered shoulder 14d which provides an abutment limiting relative movement of the parts in one direction.

A head or upper plunger member 18 is press fitted onto the top end of the shank 14c above the reduced diameter portion 14c′. This head 18 has a shoulder 18a engaged by the upper end coil of the return spring 17. The head slidably fits in the bore 11c and has a peripheral groove 18b receiving a circular type seal, preferably an O-ring seal 19. The O-ring 19 is composed of rubber or other suitable elastic sealing material and sealingly engages the bore 11c and the bottom of the groove 18b.

The head 18 has a shoulder 18c at the top thereof engaged by a snap-ring 20 seated in the groove 11d of the body 11 against the abutment shoulder thereof. This snap-ring serves as a retainer to maintain the head inside of the tappet barrel.

The top of the head has a recess 18d in the center thereof coacting with a recess 14e in the top of the shank 14c to provide a seat for a push rod, a valve stem tip, or the like.

The bottom portion of the tappet barrel or body is filled with a hydraulic fluid such as oil, a silicone polymer, or any suitable hydraulic fluid. A silicone oil of about 600,000 centistokes is a very desirable hydraulic fluid.

The hydraulic fluid in the bottom of the tappet barrel is divided into a lower or pressure compartment A and an upper or storage compartment B by the choke ring and valve. The cup seal 15 is bottomed on the oil in the storage compartment B under the load of the return spring 17.

In operation, when the cam C imparts a lifting action to the tappet barrel 11 for opening the poppet valve V, the load of the valve spring S is transmitted to the tappet valve 14 and through this valve 14 to the choke ring 13. This choke ring, however, rests on the body of hydraulic fluid in the compartment A and the lifting action from the tappet barrel is transmitted through this trapped oil in compartment A to the thrust load transmitting tappet valve 14 and thence to the engine valve V. Some leakdown will occur between the periphery 13a of the choke ring 13 and the bore 11c of the tappet body to permit fluid to flow from the pressure compartment A to the storage compartment B. This leakdown permits the tappet valve 14 to drop in the barrel thereby shortening the assembly.

In the closed engine valve cycle of operation the load of the engine valve spring S on the tappet is removed and the tapped return spring 17 becomes effective to reclaim the starting length of the tappet assembly by forcing the upper plunger or head 18 of the valve toward the open end of the barrel. This, of course, will raise the valve head 14a off of the choke ring seat 13b to place the compartments A and B in full communication. The fluid in the compartment B is also under the load of the return spring 17 through the lower plunger 16 and seal cup 15 and will flow through the choke ring back to the compartment A as the choke ring urged by the spring 12 follows the raised valve head 14a. As the pressures in compartments A and B begin to equalize, the choke ring will be in very close proximity to the valve seat, thereby placing the tappet parts in position for the next engine valve opening cycle.

Since the hydraulic fluid in the compartments A and B is sealed and since these compartments are always completely filled with oil so that no air space can be created, no problems of dirt contamination, foam, or the like, are encountered. Should any fluid leak out of the compartment B, the return spring 17 is effective to slide the lower plunger 16 toward the bottom of the tappet barrel to maintain the cup 15 on top of a solid column of hydraulic fluid.

The O-ring seal 19 does not interfere with the free sliding action of the upper plunger 18 in the bore 11c but it is effective to keep dirt out of the chamber containing the return spring 17.

From the above description it will be evident that if clearance occurs in the valve train shown in Figure 1, the return spring 17 will act on the plunger 16 and head 18 to move them axially of the tappet barrel 11. This will force hydraulic fluid from the chamber B to the chamber A thereby raising the valve 14 to cause an elongation of the assembly and a reclaiming of any gap imposed by looseness or slack in the linkage. Flow from compartment B to the pressure chamber A, of course, occurs very rapidly through the choke ring while reverse flow is impeded because the valve is seated in the choke ring and this reverse flow can only occur through the clearance gap around the choke ring.

As illustrated in the comparative positions of the tappet parts in Figures 1 to 4, when the valve train linkage is operating under equilibrium conditions i. e., when the linkage is neither elongating nor shortening, the tappet 10 of this invention will still maintain a constant clearance the linkage because the parts are so related that the valve in the tappet is never fully closed under normal operating conditions. Thus, as shown in Figure 1, just before the engine valve V is opened, i. e., as the tappet just begins to be acted by the ramp of the cam C the valve head seating face 14b is still spaced from the seating face 13b of the choke ring so that a flow path exists through the choke ring. This flow path, of course, is choked or restricted because the opposed seating faces of the valve and choke ring are relatively close together.

As shown in Figure 2, as the cam C lifts the tappet 10, the load of the engine valve spring S will be transmitted to the tappet valve 14 and the tappet valve will then assume a full seat on the choke ring. The initial lifting operation of the cam on the tappet barrel, therefore, is spent in closing the gap between the tappet valve and the choke ring without actually moving the engine valve. As the lifting action continues, however, the choke ring and the valve head seated therein trap the hydraulic fluid in the compartment A so that the lifting action of the cam will be transmitted through the solid column of hydraulic fluid to the tappet valve which in turn, of course, raises the engine valve. During this engine valve opening cycle, some leakdown of fluid will occur from the pressure compartment A into the storage compartment B because of the clearance between the choke ring and the tappet bore. As illustrated by comparison of Figures 2 and 3 this leakdown permits the choke ring and valve to drop further into the tappet barrel thereby permitting the tappet assembly to assume a shortened condition. Thus, as illustrated in Figure 3, just before the engine valve again closes, the choke ring and tappet valve have moved closer to the bottom 11a of the tappet barrel. This leakdown under load is essential to prevent the linkage from over-lengthening and thereby interfere with full seating of the engine valve.

As illustrated in Figure 4, as soon as the engine valve is closed and the load of the valve spring S is removed from the tappet, the return spring 17 in the tappet is effective to lengthen the assembly by urging the tappet valve toward the open end of the barrel. This causes the head to move away from the choke ring thereby opening up a free flow passage through the choke ring whereupon the load of the return spring 17 on the fluid in the compartment B will cause this fluid to flow back to the compartment A while the choke ring spring 16 raises the choke ring toward the tappet valve. Free flow between compartment B and compartment A permits a rapid recovery of the tappet. This free flow, of course, is impeded and choked as the choke ring approaches a full seating relation with the tappet valve head but, as explained above, this full seating is never achieved in the tappets of this invention.

In accordance with this invention, the parts are so designed that the hydraulic fluid will choke a full seating of the valve and choke ring in the closed engine valve cycle. This controlled partial seating of the tappet valve is influenced by the following factors:

1. The leakdown clearance between the choke ring and the bore of the tappet barrel,
2. The length of the leakdown passage around the choke ring,
3. The force of the choke valve return spring,
4. The fraction of camshaft rotation causing unseating of engine valve, i. e., extent of cam lobe in radians divided by $2\pi$,
5. The seat angle of the tappet valve,
6. The tappet valve diameters (maximum and minimum),
7. Tappet bore diameter, and
8. Poppet valve spring force.

It has been found that the constant clearance built into the tappets of this invention varies directly as the leakdown clearance between the choke ring and the tappet barrel and the speed of operation while varying inversely as the force of the choke spring 12 and the length of the leakdown passage around the choke ring.

Since the entrapment of fluid between the choke ring and the tappet valve is influenced by the angle of the valve seating face and the maximum and minimum diameters of the valve, all of these factors determining the proportion of flow of the trapped fluid into the compartments A and B, these factors are also considered in the tappets of the present invention.

In Figure 5, the various factors involved in rendering the tappets of this invention capable of maintaining a constant clearance of a predetermined magnitude in an operating valve linkage are designated as follows:

$C_1$ = leakdown clearance between choke ring and tappet barrel,
$d_1$ = maximum valve head diameter,
$d_4$ = minimum diameter of valve head,
$F_3$ = poppet valve spring,
$\beta$ = the fraction of camshaft rotation causing unseating of the engine valve,
$d_2$ = tappet bore diameter,
$L$ = length of leakdown passage,
$\phi$ = valve seat angle,
$F_2$ = mean choke spring force.

The predetermined clearance for the tappet is identified as C and is maintained within a preferred range of .001″ to .003″ or a broad range of .0005″ to .030″ in accordance with the following equation:

$$C = \sqrt[4]{\frac{5.3 C_1^3 (d_1-d_4)}{L \cos^5 \theta} \left[ \frac{F_3(d_2^2-d_1^2)\beta}{(1-\beta)F_2 d_2} \cdot \frac{d_2}{} \right]} = .0005'' \text{ to } .30''$$

The above equation was developed on the basis that laminar hydraulic flow occurs in both the leakdown path around the choke ring and through the port in the choke ring. It was also assumed that the engine speed is relatively high so that changes in clearance while the tappet is on the base circle or the lift ramp of the cam are small.

It has been found that for practical purposes the leakdown clearance can vary from a minimum of .0003″ to a maximum of .0080″; the leakdown passage can vary from a minimum of .050″ to a maximum of .75″; the pressure developed by the choke spring must be less than the pressure developed by the tappet valve return spring; and the seat angle can be varied from 0° to 90° from a transverse plane.

From the above descriptions it will, therefore, be understood that this invention provides a thrust load transmitting valve type of hydraulic tappet with a leakdown factor correlated with a valve flow condition to produce a valve and seat arrangement which does not completely close during actual operation of the tappet in an engine so that the tappet will automatically produce a predetermined or constant clearance of from .0005″ to .030″ without adding heretofore required extra parts to the tappet.

It will be understood that modifications and variations may be effected without departing from the scope of the novel concepts of the present invention.

I claim as my invention:

1. A clearance regulator comprising a body, means confining a hydraulic fluid in said body, a thrust load transmitting valve having a stem slidable in said body and having a head projecting into the hydraulic fluid in the body, a choke ring in said hydraulic fluid coacting with said valve head to provide a piston therewith dividing the confined fluid chamber into two compartments, a spring urging the choke ring toward the valve head, a return spring urging the valve head away from the choke ring, and a leakdown clearance between the choke ring and the body accommodating flow of hydraulic fluid, the diameters of said valve head and stem and the configuration of said valve head and said choke ring which cooperate to define a passage for hydraulic fluid between the choke ring and valve head, being correlated with the said leakdown clearance to maintain a predetermined constant clearance of from .0005 to .030 inches in the operation of the clearance regulator.

2. A thrust valve type hydraulic tappet which comprises a tappet barrel, a valve member having a head adjacent the bottom of the barrel, a stem extending upwardly in the barrel from the head, and a plunger affixed to the stem and slidably mounted in the barrel to guide the head, a second plunger slidably mounted in the barrel beneath said first mentioned plunger, a return spring compressed between the first and second plungers, a seal under the second plunger around the valve stem for confining a body of hydraulic fluid in the bottom of the barrel, a choke ring coacting with the head of said valve in the body of fluid beneath the seal, a choke ring spring urging the ring toward the valve head, said choke ring coacting with the barrel to provide a leakage path, said choke ring coacting with the valve head to provide a free flow passage between opposite sides of the choke ring, and said passage and said leakdown clearance being correlated with the spring load on the choke valve to maintain a constant clearance of from .0005 to .030 inches in the operation of the tappet.

3. A hydraulic tappet of the thrust load transmittting valve type which comprises a body, an apertured piston slidably mounted in the body, a valve coacting with the piston to control flow through the piston aperture, a return spring in the body for elongating the tappet assembly, a valve spring for closing the valve, means confining a body of hydraulic fluid in the body on opposite sides of the piston, said means being loaded by the return spring, and said piston having a leakdown clearance relationship with the tappet body together with a free flow passage through the aperture thereof and around the valve, and said leakdown clearance having a diametral dimension and a length dimension correlated with the said valve spring and the flow through the aperture of said piston as defined by the said valve and the piston aperture to maintain a constant clearance of .001 to .003 inches in the operation of the tappet.

4. A hydraulic clearance regulator of the thrust load transmitting valve type for use with an engine poppet valve closed with a spring of $F_3$ magnitude which comprises a tappet barrel with an internal diameter dimension $d_2$ defining a chamber for hydraulic fluid, a choke ring freely slidable in said barrel and having a diametral clearance dimension $C_1$ between the periphery thereof and the internal diameter of the barrel, said choke ring having a length dimension $L$ for flow of fluid through the clearance to opposite sides of the choke ring, a thrust load carrying valve having an active end with a minimum diameter dimension $d_4$ and maximum diameter dimension $d_1$, said valve coacting with said choke ring to control the orifice therethrough, a return spring for said thrust load carrying valve for urging the valve in a direction to lengthen the regulator, said active end of the valve having an angle $\theta$ relative to a transverse plan through said active end, a spring acting on said choke ring to urge the ring against said valve and having a mean force of $F_2$ magnitude, and a fraction $\beta$ of camshaft rotation causing unseating of the engine valve wherein said angle and said dimensions are correlated with that fraction of camshaft rotation causing unseating of the engine valve and the poppet valve spring force $F_3$ to provide the following equation:

$$\sqrt[4]{\frac{5.3C_1^3(d_1-d_4)}{L \text{ cosine}^5 \theta}\left[\frac{F_3(d_2^2-d_1^2)\beta}{(1-\beta)F_2 d_2}-\frac{d_2}{}\right]}=.0005'' \text{ to } .039''$$

5. An hydraulic clearance regulator of the thrust load transmitting valve type which comprises a tappet barrel, a choke ring freely slidable in said barrel and having a leakdown clearance relation therewith lying between .0003" and .008", said choke ring coacting with said barrel to provide a leakdown passage length between .050" to .75", a thrust load carrying valve having an active end with a seating face having an angle of from 0° to 90° from a transverse plane through the tappet barrel, a return spring acting on said thrust load carrying valve to lengthen the regulator, said active end of said valve coacting with said choke ring to control flow through the choke ring, a spring acting on said choke ring to urge the ring against the active end of the valve, said choke ring spring developing a pressure correlated with the control flow passage provided by said active end of said valve and said choke ring and with said leak down clearance to maintain a constant clearance of from .0005 inches to .030 inches in the operation of the tappet.

References Cited in the file of this patent

UNITED STATES PATENTS

| 2,308,858 | Burkhardt | Jan. 19, 1943 |
| 2,325,932 | Banker | Aug. 3, 1943 |
| 2,468,332 | Johnson | Apr. 26, 1949 |
| 2,570,853 | Pierce | Oct. 9, 1951 |
| 2,570,854 | Pierce | Oct. 9, 1951 |
| 2,689,554 | Moser | Sept. 21, 1954 |
| 2,691,367 | Thoren | Oct. 12, 1954 |